US008768590B2

(12) United States Patent
Tsukamoto et al.

(10) Patent No.: US 8,768,590 B2
(45) Date of Patent: Jul. 1, 2014

(54) CONTROL DEVICE FOR AN AUTOMATIC TRANSMISSION

(75) Inventors: Norihiro Tsukamoto, Toyota (JP); Atsushi Ayabe, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1283 days.

(21) Appl. No.: 12/597,051

(22) PCT Filed: Apr. 25, 2008

(86) PCT No.: PCT/IB2008/001018
§ 371 (c)(1),
(2), (4) Date: Oct. 22, 2009

(87) PCT Pub. No.: WO2008/132585
PCT Pub. Date: Nov. 6, 2008

(65) Prior Publication Data
US 2010/0121542 A1   May 13, 2010

(30) Foreign Application Priority Data

Apr. 26, 2007   (JP) .................. 2007-116365

(51) Int. Cl.
*G06F 7/00*   (2006.01)
(52) U.S. Cl.
USPC ........ 701/68; 192/3.33; 192/82 T; 192/220.1; 477/53; 477/62; 477/168; 701/58; 701/60; 701/67
(58) Field of Classification Search
USPC .......... 475/117; 477/107, 109, 110, 114, 115, 477/116, 117, 39, 97, 53, 62, 168; 701/51, 701/58, 60, 66, 67, 68; 192/3.33, 82 T, 192/220.1
See application file for complete search history.

(56) References Cited

U.S. PATENT DOCUMENTS

| 5,005,444 | A | | 4/1991 | Kimura et al. |
| 5,267,158 | A | * | 11/1993 | Sakaguchi et al. ............ 701/68 |
| 5,954,776 | A | * | 9/1999 | Saito et al. ..................... 701/51 |
| 5,976,057 | A | | 11/1999 | Mori |
| 6,077,191 | A | | 6/2000 | Minowa et al. |
| 6,270,443 | B1 | * | 8/2001 | Ito et al. ....................... 477/114 |
| 6,334,833 | B1 | | 1/2002 | Ochi et al. |
| 2002/0160882 | A1 | * | 10/2002 | Michioka et al. ............ 477/168 |
| 2002/0177506 | A1 | * | 11/2002 | Satou et al. .................. 477/156 |

(Continued)

FOREIGN PATENT DOCUMENTS

| CN | 1892076 A | 1/2007 |
| JP | 01-229147 A | 9/1989 |

(Continued)

OTHER PUBLICATIONS

Office Action dated Feb. 2, 2004 for counterpart U.S Appl. No. 10/303,891.

*Primary Examiner* — Stephen Holwerda
(74) *Attorney, Agent, or Firm* — Sughrue Mion, PLLC

(57) ABSTRACT

A transmission ECU 12 determines whether or not the conditions for executing a neutral control operation are satisfied (step S11), and measures hydraulic oil temperature if it determines that the execution conditions are satisfied (step S12). Then, the transmission ECU 12 sets a target speed ratio for a torque converter 3 corresponding to the measured hydraulic oil temperature (step S13), and performs a neutral control operation to bring the speed ratio of the torque converter 3 equal to the target speed ratio (step S14).

9 Claims, 8 Drawing Sheets

(56) References Cited

U.S. PATENT DOCUMENTS

| | | |
|---|---|---|
| 2002/0198647 A1 | 12/2002 | Kawamoto et al. |
| 2003/0186779 A1* | 10/2003 | Mori et al. ............... 477/92 |
| 2005/0021208 A1* | 1/2005 | Nagai et al. ............... 701/54 |
| 2005/0064988 A1* | 3/2005 | Hasegawa et al. .......... 477/70 |
| 2005/0221955 A1* | 10/2005 | Akaike ................... 477/156 |
| 2005/0222734 A1* | 10/2005 | Akaike .................... 701/51 |
| 2006/0293146 A1* | 12/2006 | Nakayashiki et al. ....... 477/76 |
| 2009/0111651 A1* | 4/2009 | Gale et al. ............... 477/98 |

FOREIGN PATENT DOCUMENTS

| | | |
|---|---|---|
| JP | 07-019326 A | 1/1995 |
| JP | 07-027215 A | 1/1995 |
| JP | 10-159969 A | 6/1998 |
| JP | 10-184880 A | 7/1998 |
| JP | 2004-125040 A | 4/2004 |
| JP | 2007-009930 A | 1/2007 |

* cited by examiner

FIG.3

|     |     | C1 | C2 | B1 | B2 | B3 | F |
|-----|-----|----|----|----|----|----|---|
|     | R   | ×  | ×  | ×  | ○  | ○  | × |
|     | N   | ×  | ×  | ×  | ×  | ×  | × |
| D   | 1st | ○  | ×  | ×  | ◎  | ×  | △ |
|     | 2nd | ○  | ×  | ○  | ×  | ×  | × |
|     | 3rd | ○  | ×  | ×  | ×  | ○  | × |
|     | 4th | ○  | ○  | ×  | ×  | ×  | × |
|     | 5th | ×  | ○  | ×  | ×  | ○  | × |
|     | 6th | ×  | ○  | ○  | ×  | ×  | × |

○ ENGAGEMENT
× DISENGAGEMENT
◎ ENGAGEMENT ONLY DURING ENGINE BRAKING
△ ENGAGEMENT ONLY DURING DRIVING

F I G . 4
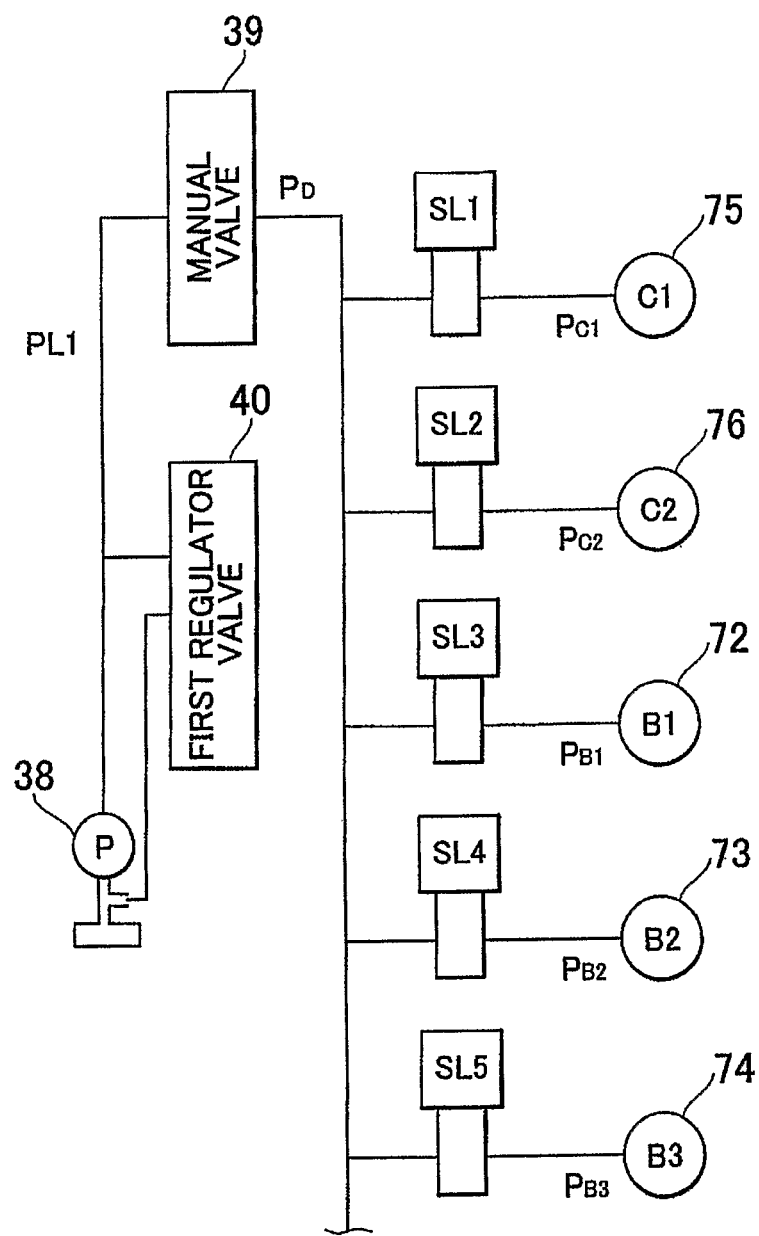

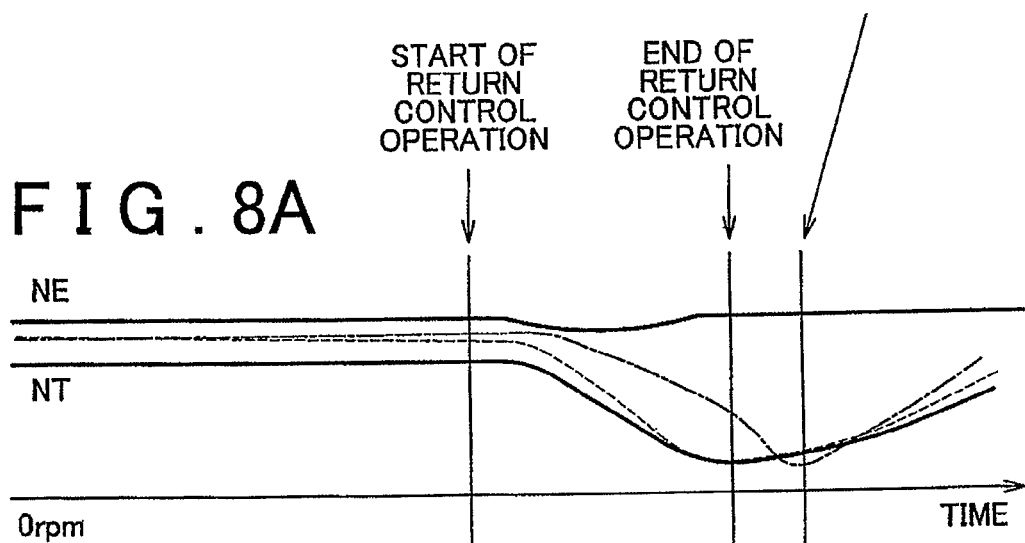
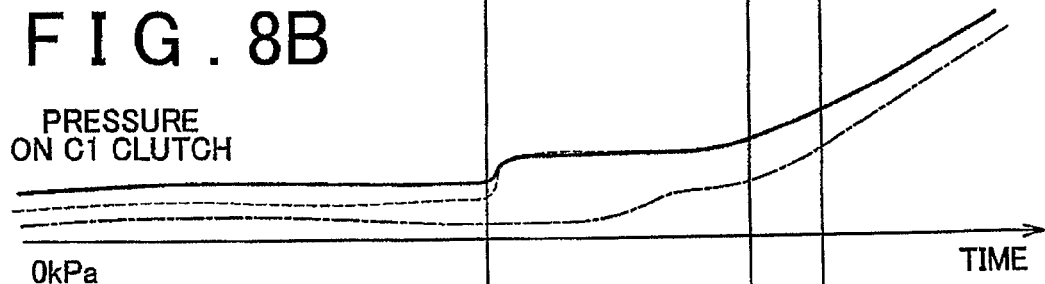
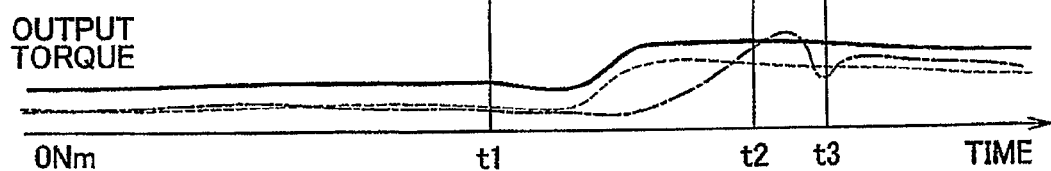

CONTROL DEVICE FOR AN AUTOMATIC TRANSMISSION

BACKGROUND OF THE INVENTION

1. Field of the Invention

The present invention relates to a control device for an automatic transmission, and, in particular, to a control device for an automatic transmission which performs a neutral control operation.

2. Description of the Related Art

In general, in a control device for an automatic transmission, when the vehicle is stopped in a forward range, a creep phenomenon occurs in which the driving force generated by the idling rotation of the engine is transmitted as creep force to the driving wheels via torque converter and transmission mechanism. To keep the vehicle stationary, the driver must operate the brake to suppress the creep force, and the fuel efficiency of the engine decreases by the amount corresponding to the creep force consumed by the brake. Thus, when vehicle is stationary in a forward range with the brake pedal depressed to actuate the brake and accelerator almost fully closed, the control device for an automatic transmission performs a neutral control operation to shift the automatic transmission from a drive mode to a neutral mode in which the forward clutch is half-engaged and slips with the vehicle in the forward range.

A control device for an automatic transmission of this type decreases the engaging pressure on the forward clutch to decrease the temperature of the forward clutch to a predetermined value or lower so that the forward clutch cannot be excessively heated by the frictional heat caused by the slippage during the neutral control operation (see Japanese Patent Application Publication No. 2007-9930 (JP-A-2007-9930), for example).

While performing a neutral control operation, the control device for an automatic transmission disclosed in JP-A-2007-9930 estimates the temperature of the forward clutch based on the engine speed, the ratio between the engine speed and the turbine speed of the torque converter, the hydraulic oil temperature and the duration of the neutral control operation, and decreases the engaging pressure on the forward clutch to reduce generation of frictional heat when the estimated forward clutch temperature exceeds a predetermined temperature.

However, in the above control device for an automatic transmission, when the temperature of the hydraulic oil for use in engaging the forward clutch is low, the response of hydraulic pressure is slow, in other words, the actual hydraulic pressure does not follow a desired hydraulic pressure, because of the high viscosity of the hydraulic oil, and the engaging pressure on the forward clutch may not rise as desired when the automatic transmission is returned from the neutral mode to the drive mode. Also, if the engaging pressure on the forward clutch is decreased in view of the fact that the viscosity of the lubricating oil supplied to the frictional engagement element is also high when the temperature is low, the solenoid for controlling the engagement and disengagement of the forward clutch operates in a low pressure range in which the pressure response is slow and the delay in the rise of the engaging pressure on the forward clutch may increase when the automatic transmission is returned from the neutral mode to the drive mode.

As described above, when the temperature of the hydraulic oil is low, the rise in the engaging pressure on the forward clutch delays because of the slow response of the hydraulic pressure or some other reason when the automatic transmission is returned from the neutral mode to the drive mode. Thus, the forward clutch cannot be engaged smoothly when the vehicle is started. As a result, a shock occurs to the vehicle or the starting performance of the vehicle is deteriorated, resulting in poor driveability.

SUMMARY OF THE INVENTION

The present invention provides a control device for an automatic transmission which can prevent slow response of hydraulic pressure which may cause a delay in the rise of the forward clutch to ensure smooth engagement of the forward clutch even if the temperature of hydraulic oil is low when the automatic transmission is returned from a neutral mode to a drive mode and thus can prevent a shock from occurring to the vehicle when the vehicle is started and deterioration of starting performance of the vehicle and can improve the driveability.

A control device for an automatic transmission according to a first aspect of the present invention relates to a control device for an automatic transmission including: a transmission mechanism having an engagement element which is engaged at startup; a torque converter for transmitting power from a power source to the transmission mechanism; and neutral control means for performing a neutral control operation to decrease an engaging pressure on the engagement element when a vehicle is stationary in a forward range and performing a return control operation to engage the engagement element at the start of the vehicle. The control device for an automatic transmission has: hydraulic oil temperature measuring means for measuring temperature of hydraulic oil for operating the engagement element at the start of the neutral control operation; actual speed ratio calculating means for acquiring the rotational speed of the power source and the rotational speed of a turbine of the torque converter and calculating a speed ratio of the torque converter represented by the ratio between the rotational speed of the power source and the rotational speed of the turbine of the torque converter as an actual speed ratio; and target speed ratio setting means for setting a target value for the speed ratio of the torque converter as a target speed ratio. The target speed ratio setting means sets the target speed ratio such that the actual speed ratio becomes lower than the speed ratio in the case where the hydraulic oil temperature is normal when the temperature of hydraulic oil measured by the hydraulic oil temperature measuring means is lower than a predetermined threshold value, and the neutral control means adjusts the engaging pressure on the engagement element to bring the actual speed ratio equal to the target speed ratio during the neutral control operation.

With this configuration, if the hydraulic oil temperature is low when the automatic transmission is shifted to the neutral mode, the control device for an automatic transmission according to the present invention sets the target speed ratio for the torque converter to a value which is lower than that in the case where hydraulic oil temperature is normal and previously maintains the engaging pressure on the engagement element at a value higher than usual in order to improve the hydraulic pressure response. Thus, when the automatic transmission is returned from the neutral mode to the drive mode, even if the temperature of the hydraulic oil is low and the viscosity of the hydraulic oil is high, a delay in the rise of the engaging pressure on the engagement element can be prevented and the engagement element can be engaged smoothly. It is, therefore, possible to prevent a shock from being applied to the vehicle at the start of the vehicle and deterioration of the starting performance of the vehicle (hesitation) and thus to improve the driveability.

The neutral control means may maintain the engaging pressure on the engagement element higher than that in the case where the hydraulic oil temperature is normal so that the actual speed ratio becomes equal to the target speed ratio during the neutral control operation.

The target speed ratio setting means may set the target speed ratio lower as the temperature of the hydraulic oil is lower when the temperature of the hydraulic oil is lower than the predetermined threshold value.

With this configuration, the control device for an automatic transmission according to the present invention can set the target speed ratio for the torque converter to a lower value and set the engaging pressure on the engagement element during a neutral control operation to a higher value as the hydraulic oil temperature is lower. Therefore, even if the viscosity of the hydraulic oil is further increased, a delay in the rise of the engaging pressure on the engagement element can be prevented and the engagement element can be engaged smoothly. It is, therefore, possible to prevent a shock from being applied to the vehicle at the start of the vehicle and deterioration of the starting performance of the vehicle (hesitation) and thus to improve the driveability.

The normal temperature of the hydraulic oil may be a temperature in a temperature range in which the viscosity of the hydraulic oil is almost constant, and the threshold value may be the boundary temperature between low and normal temperature ranges for the hydraulic oil. In this case, the threshold value may be 80° C.

The neutral control operation may be performed while a forward gear ratio is established in the automatic transmission and a brake pedal is being depressed a predetermined amount or more. The control device for an automatic transmission may adjust the engaging pressure on the engagement element by controlling the pressure of the hydraulic oil for operating the engagement element.

The neutral control means may perform feedback control during a neutral control operation to adjust the engaging pressure on the engagement element based on the difference between the actual speed ratio and the target speed ratio in order to bring the actual speed ratio equal to the target speed ratio.

The control device for an automatic transmission according to the present invention can perform feedback control to adjust the engaging pressure on the engagement element properly in order to bring the actual speed ratio of the torque converter closer to the target speed ratio at all times based on the difference between the actual speed ratio of the torque converter and the target speed ratio therefor when the automatic transmission is in the neutral mode. Thus, since the engaging pressure on the engagement element has reached an optimum value when returning the automatic transmission from the neutral mode to the drive mode is started, the engagement element can be engaged more smoothly during the returning process and the driveability during the return control operation can be further improved.

A second aspect of the present invention relates to a method for controlling an automatic transmission including a transmission mechanism having an engagement element which is engaged at startup, and a torque converter for transmitting power from a power source to the transmission mechanism. The method for controlling an automatic transmission includes the steps of: performing a neutral control operation to decrease an engaging pressure on the engagement element when a vehicle is stationary in a forward range; measuring temperature of hydraulic oil for operating the engagement element at the start of the neutral control operation; acquiring the rotational speed of the power source and the rotational speed of a turbine of the torque converter; calculating a speed ratio of the torque converter represented by the ratio between the rotational speed of the power source and the rotational speed of the turbine of the torque converter as an actual speed ratio; setting a target speed ratio as a target value for the speed ratio of the torque converter such that the actual speed ratio becomes lower than the speed ratio in the case where the hydraulic oil temperature is normal when the temperature of hydraulic oil measured by the hydraulic oil temperature measuring means is lower than a predetermined threshold value, adjusting the engaging pressure on the engagement element to bring the actual speed ratio equal to the target speed ratio, and performing a return control operation to engage the engagement element at the start of the vehicle.

According to the present invention, there can be provided a control device for an automatic transmission which can prevent a delay in the rise of the engaging pressure on an engagement element to ensure smooth engagement of the engagement element even if the temperature of the hydraulic oil is low and the viscosity of the hydraulic oil is high when the automatic transmission is returned from the neutral mode to the drive mode and thus can prevent a shock from occurring to the vehicle at the start of the vehicle and deterioration of starting performance of the vehicle and improve the driveability.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein:

FIG. 3 is an operation table of the automatic transmission according to the embodiment of the present invention;

FIG. 4 is a circuit diagram illustrating the general configuration of a hydraulic control circuit according to the embodiment of the present invention;

FIGS. 8A, 8B and 8C are timing charts showing the changes in the turbine rotational speed, the engaging pressure on the C1 clutch and output torque during a neutral control operation according to the embodiment of the present invention.

DETAILED DESCRIPTION OF THE EMBODIMENTS

Description is hereinafter made of an embodiment of the present invention with reference to the drawings.

Figure 1:
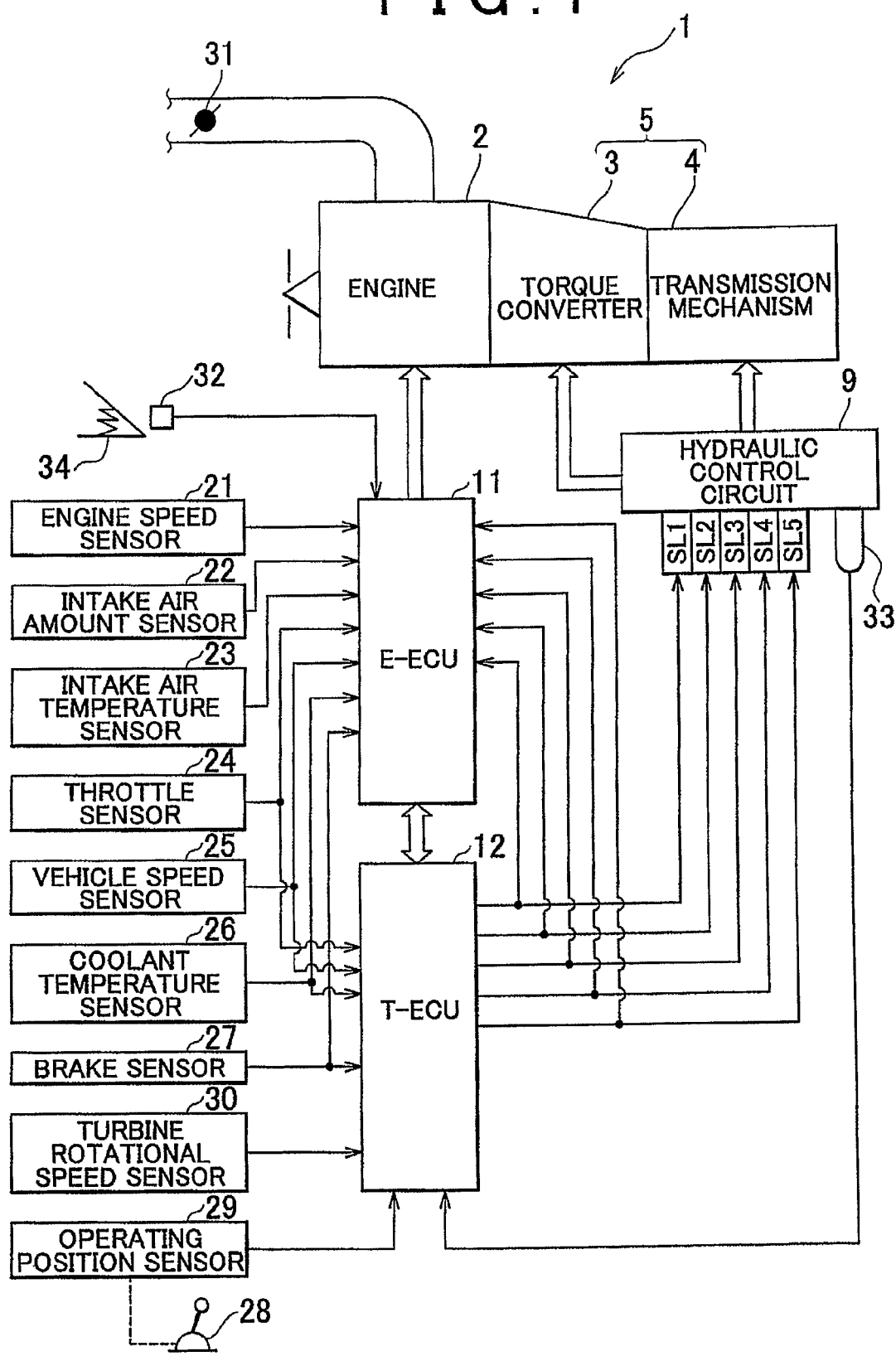
FIG. 1 is a general configuration diagram schematically illustrating a vehicle provided with a control device for an automatic transmission according to one embodiment of the present invention.
Figure 2:
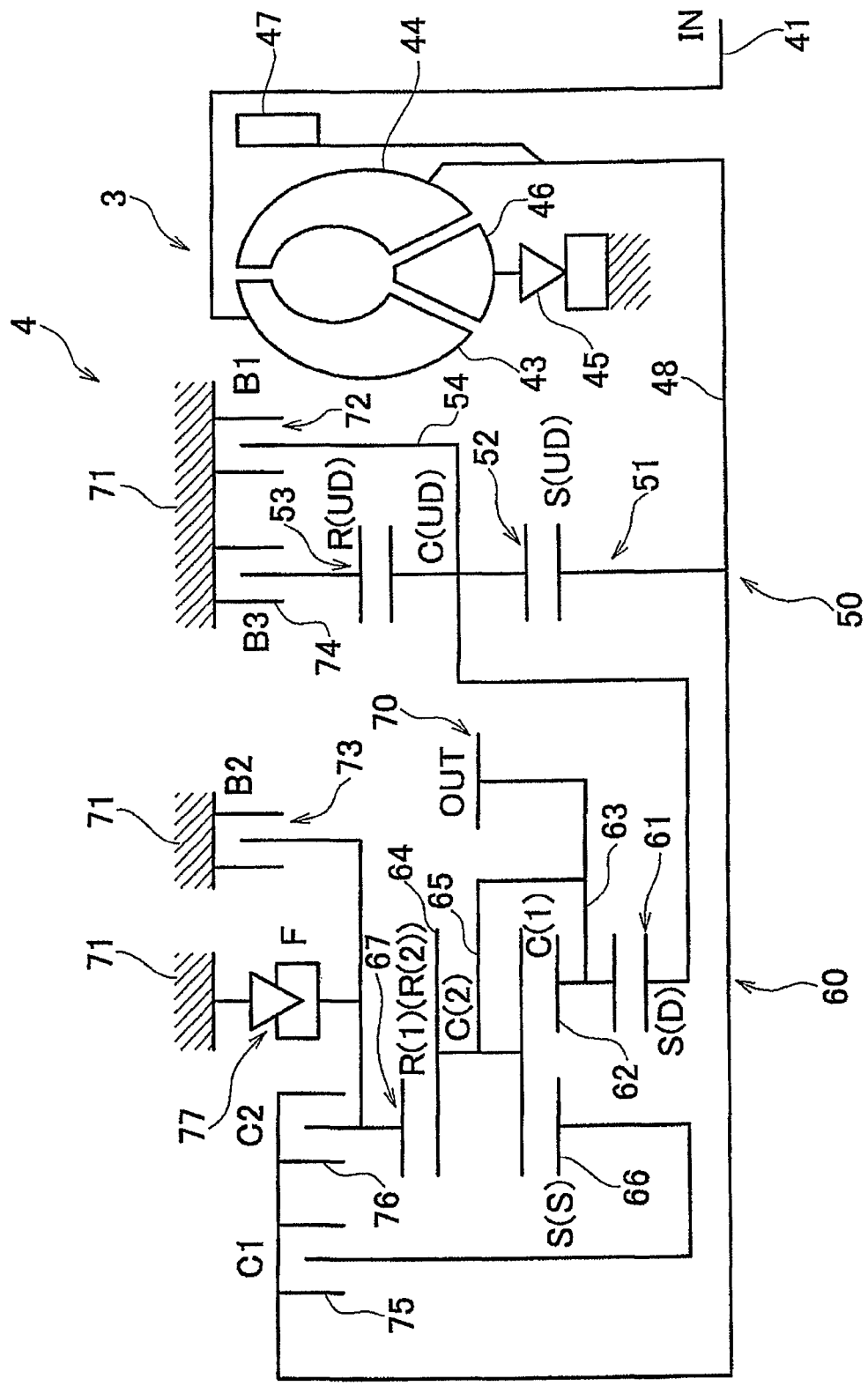
FIG. 2 is an outline diagram illustrating the configuration of the control device for an automatic transmission according to the embodiment of the present invention.

FIG. 1 is a general configuration diagram schematically illustrating a vehicle provided with a control device for an automatic transmission according to one embodiment of the present invention. FIG. 2 is an outline diagram illustrating the configuration of the control device for an automatic transmission according to the embodiment of the present invention.

In this embodiment, the case where the control device for an automatic transmission according to the present invention is applied to an FF (Front engine Front drive) vehicle is described.

As shown in FIG. 1, a vehicle 1 has an engine 2; a torque converter 3; a transmission mechanism 4 having a forward clutch; a hydraulic control circuit 9 for controlling the torque converter 3 and the transmission mechanism 4 by hydraulic pressure; an engine ECU (Electronic Control Unit) 11 for controlling the engine 2 as a power source; and a transmission ECU 12 for controlling the hydraulic control circuit 9.

The engine 2 is an internal combustion engine in which mixture of fuel and air injected from an injector (not shown) is combusted in the combustion chamber in the cylinder. The piston in the cylinder is pushed downward by combustion energy to rotate a crankshaft. An external combustion engine may be used in place of an internal combustion engine. A rotating electric machine or the like may be used in place of the engine 2.

The torque converter 3 transmits power with increased torque from the engine 2 to the transmission mechanism 4. The torque converter 3' has a pump impeller (which is hereinafter referred to simply as "impeller") connected to the output shaft of the engine 2; a turbine runner (which is hereinafter referred to simply as "turbine") connected to the input shaft of the transmission mechanism 4; and a stator which is prevented from rotating in one direction by a one-way clutch as described later. Power is transmitted from the impeller to the turbine through a fluid medium.

The torque converter 3 also has a lock-up clutch 47 (see FIG. 2) for directly coupling the impeller and the turbine mechanically to improve the efficiency of power transmission from the engine 2 to the transmission mechanism 4 when the vehicle 1 runs at high speed.

The torque converter 3 and the transmission mechanism 4 constitute an automatic transmission 5. The automatic transmission 5 changes the rotational speed of the output shaft of a gearbox (not shown) to a desired rotational speed by establishing a desired gear ratio. The power outputted from an output gear of the automatic transmission 5 is transmitted to right and left front wheels (not shown) via a differential gear (not shown) and a drive shaft. The transmission mechanism 4 is described in detail later.

The hydraulic control circuit 9 has linear solenoid valves SL1 to SL5. The hydraulic control circuit 9 also has an oil temperature sensor 33 for measuring the temperature of hydraulic oil.

The engine ECU 11 has a CPU (Central Processing Unit); a RAM (Random Access Memory); a ROM (Read Only Memory); and an input/output interface (which are not shown). The engine ECU 11 controls the rotational speed of the engine with the CPU based on signals inputted from an accelerator sensor and a throttle sensor and a map stored in the ROM, and so on which are described later.

The transmission ECU 12 has a CPU, a RAM, a ROM and an input-output interface (which are not shown). A map in which the vehicle speed and throttle opening are associated with the gear ratios of the transmission mechanism 4 is stored in the ROM of the transmission ECU 12. Therefore, the transmission ECU 12 determines a gear ratio of the transmission mechanism with the CPU based on signals inputted from the vehicle speed sensor and the throttle sensor, which are described later, and the map stored in the ROM.

The transmission ECU 12 changes the operating conditions of the linear solenoid valves SL1 to SL5 to selectively engage and disengage frictional engagement elements of the transmission mechanism 4 by means of hydraulic pressure derived from line pressure. By establishing different combinations of engagement and disengagement of the frictional engagement elements, the ratio of the rotational speeds of the input and output shafts of the transmission mechanism 4 is changed to establish a gear ratio.

The transmission ECU 12 functions as a control device according to the present invention as described later, and includes hydraulic oil temperature measuring means; actual speed ratio calculating means; target speed ratio setting means; and neutral control means.

The vehicle 1 is also provided with an engine rotational speed sensor 21 for measuring the rotational speed NE of the engine 2; an intake air amount sensor 22 for measuring the intake air amount to the engine 2; an intake air temperature sensor 23 for measuring the temperature of air being introduced into the engine 2; a throttle sensor 24 for detecting the opening of a throttle valve 31; a vehicle speed sensor 25; a coolant temperature sensor 26 for measuring the temperature of engine coolant; a brake sensor 27; an operating position sensor 29 for detecting the operating position of a shift lever 28; and a turbine rotational speed sensor 30 for measuring the rotational speed NT of the turbine of the torque converter 3.

The engine rotational speed sensor 21 measures the rotational speed of the engine 2 based on the rotation of the crankshaft.

The throttle sensor 24 is constituted of a hall element which produces an output voltage proportional to the throttle opening of the throttle valve 31, for example. The throttle sensor 24 outputs the output voltage as a signal representing the throttle opening of the throttle valve 31 to the engine ECU 11 and the transmission ECU 12.

The vehicle speed sensor 25 outputs a signal representing the rotational speed of the output shaft of the transmission mechanism 4 to the engine ECU 11 and the transmission ECU 12. The engine ECU 11 and the transmission ECU 12 calculates the vehicle speed based on the signal.

The coolant temperature sensor 26 is constituted of a thermistor which changes the resistance value according to a water temperature, for example, and outputs a signal based on the resistance value which varies depending on the coolant temperature in the engine 2 to the engine ECU 11 and the transmission ECU 12.

The brake sensor 27 transmits a signal (depression force switch signal) which changes from OFF to ON when a brake pedal (not shown) provided in the vehicle 1 is depressed a predetermined amount by the driver to the engine ECU 11 and the transmission ECU 12. For example, the brake sensor 27 transmits a signal which changes from OFF to ON when the force on the brake pedal (depression force) is increased to a predetermined value or greater to the engine ECU 11 and the transmission ECU 12.

The operating position sensor 29 detects the position of the shift lever 28, and transmits a signal representing the result of detection to the transmission ECU 12. The transmission ECU 12 establishes an optimum gear ratio of the transmission mechanism 4 in the range corresponding to the position of the shift lever 28. The operating position sensor 29 may detect, in response to an operation by the driver, the fact that the shift lever 28 is positioned in a manual position where the driver can select any gear ratio.

An accelerator opening sensor 32 is constituted of an electronic position sensor using a hall element, for example. When an accelerator pedal 34 provided in the vehicle 1 is operated by the driver, the accelerator opening sensor 32 outputs a signal representing the accelerator opening corresponding to the position to which the accelerator pedal 34 is depressed to the engine ECU 11.

As shown in FIG. 2, the torque converter 3 has an impeller 43 connected to an output shaft 41 of the engine; a turbine 44 connected to an input shaft 48 of the transmission mechanism 4; and a stator 46 which is prevented from rotating in one direction by a one-way clutch 45. Power is transmitted from the impeller 43 to the turbine 44 through a fluid medium.

The input shaft 48 of the transmission mechanism 4 is connected to the turbine 44 of the torque converter 3. Thus, the input shaft 48 of the transmission mechanism 4 also functions as an output shaft of the torque converter 3. The transmission mechanism 4 is constituted of a first planetary gear mechanism set 50; a second planetary gear mechanism set 60; an output gear 70; a B1 brake 72, a B2 brake 73 and a B3 brake 74 secured to a gear case 71; a C1 clutch 75; a C2 clutch 76; and an one-way clutch F77. The C1 clutch 75 constitutes an engagement element which is engaged when the vehicle is started as described later.

The first set 50 is constituted of a single pinion type planetary gear mechanism. The first set 50 has a sun gear S(UD) 51; a pinion gear 52; a ring gear R(UD)53; and a carrier C(UD)54.

The sun gear S(UD)51 is connected to the turbine 44 of the torque converter 3 via the input shaft 48. The pinion gear 52 is rotatably supported by the carrier C(UD)54. The pinion gear 52 is in meshing engagement with the sun gear S(UD)51 and the ring gear R(UD)53.

The ring gear R(UD)53 is selectively fixed to the gear case 71 by the B3 brake 74. The carrier C(UD)54 is selectively fixed to the gear case 71 by the B1 brake 72.

The second set 60 is constituted of a Ravigneaux type planetary gear mechanism. The second set 60 has a sun gear S(D)61; a short pinion gear 62; a carrier C(1)63; a long pinion gear 64; a carrier C(2)65; a sun gear S(S)66; and a ring gear R(1)(R(2))67.

The sun gear S(D)61 is connected to the carrier C(UD)54. The short pinion gear 62 is rotatably supported by the carrier C(1)63. The short pinion gear 62 is in meshing engagement with the sun gear S(D)61 and the long pinion gear 64. The carrier C(1)63 is connected to the output gear 70.

The long pinion gear 64 is rotatably supported by the carrier C(2)65. The long pinion gear 64 is in meshing engagement with the short pinion gear 62, the sun gear S(S)66 and the ring gear R(1)(R(2))67. The carrier C(2)65 is connected to the output gear 70.

The sun gear S(S)66 is selectively connected to the input shaft 48 via the C1 clutch 75. The ring gear R(1)(R(2))67 is selectively fixed to the gear case 71 by the B2 brake 73, and is selectively connected to the input shaft 48 by the C2 clutch 76. The ring gear R(1)(R(2))67 is connected to the one-way clutch F77, and is inhibited from rotating when a first gear ratio is established and during driving.

FIG. 3 is an operation table of the automatic transmission according to the embodiment of the present invention. The "circle" represents engagement. The "cross" represents disengagement. The "double circle" represents engagement only during engine braking. The "triangle" represents engagement only during driving. By operating the brakes and clutches by exciting and de-exciting the linear solenoid valves SL1 to SL5 and a transmission solenoid (not shown) provided in the hydraulic control circuit 9 (see FIG. 1) according to the combinations shown in the operation table, first to sixth forward gear ratios and a reverse gear ratio are established.

Here, since the one-way clutch F77 is provided in parallel to the B2 brake 73, there is no need to engage the B2 brake 73 when the first (1st) gear ratio is established and power is transmitted from the engine side (during acceleration) as indicated by "double circle" in the operation table. In this embodiment, the one-way clutch F77 inhibits rotation of the ring gear R(1)(R(2))67 when the first gear ratio is established and during driving. To apply engine brake, the one-way clutch F77 does not inhibit rotation of the ring gear R(1)(R(2))67.

To establish the first (1st) gear ratio which is used when the vehicle 1 is started, the C1 clutch 75 is engaged as indicated in the operation table. Thus, the C1 clutch 75 functions as a forward clutch, and constitutes an engagement element of the present invention which is engaged at startup.

The shift lever 28 (see FIG. 1) is movable between an L position corresponding to the low range, 2 to 3 positions corresponding to the second to third ranges, a D position corresponding to the drive range (which is hereinafter referred to simply as "D range"), an N position corresponding to the neutral range, an R position corresponding to the reverse range, and a P position corresponding to the parking range, which are arranged in this order from the rear side to the front side of the vehicle. A forward ranges indicate the ranges except the neutral range, reverse range and parking range. In this embodiment, the case in which a forward range means the D range is described.

When the shift lever 28 (see FIG. 1) is positioned in the D range, one of first to sixth gear ratios is established. As described before, the transmission ECU 12 selects one of the gear ratios based on the vehicle speed and the throttle opening.

The shift lever 28 (see FIG. 1) may be movable to an M position representing a manual position for use in a shift in a shift mode in which the gear ratio of the automatic transmission 5 (see FIG. 1) can be manually selected, a plus position (+ position) for use in directing an upshift and a minus position (− position) use in directing a downshift. In this case, the M position is located on one side of the D position. When the shift lever 28 (see FIG. 1) is moved sideways from the D position, it is held in the M position by a spring (not shown).

FIG. 4 is a circuit diagram illustrating the general configuration of a hydraulic control circuit according to the embodiment of the present invention.

The pressure of hydraulic oil fed under pressure from an oil pump 38 is adjusted to a first line pressure PL1 by a first relief regulator valve 40. The oil pump 38 is a mechanical pump which is rotatably driven by, for example, the engine 2.

The hydraulic oil having the first line pressure PL1 is supplied to a manual valve 39 operatively connected to the shift lever 28 (see FIG. 1). When the shift lever 28 is positioned in a position corresponding to a forward range, hydraulic oil having a forward position pressure $P_D$ equal to the first line pressure PL1 is supplied from the manual valve 39 to the linear solenoid valves SL1 to SL5.

The linear solenoid valves SL1 to SL5 are provided corresponding to the C1 clutch 75, the C2 clutch 76, the B1 brake 72, the B2 brake 73 and the B3 brake 74, respectively. The transmission ECU 12 adjusts hydraulic pressures $P_{C1}$, $P_{C2}$, $P_{B1}$, $P_{B2}$ and $P_{B3}$ by controlling the linear solenoid valves SL1 to SL5 with solenoid currents to engage or disengage the C1 clutch 75, the C2 clutch 76, the B1 brake 72, the B2 brake 73 and the B3 brake 74 and adjust the engaging pressures thereon.

The characteristic configurations of the transmission ECU constituting the control device for an automatic transmission according to this embodiment of the present invention are described with reference to FIG. 1.

The transmission ECU 12 starts a neutral control operation to shift the automatic transmission 5 from a drive mode to a neutral mode if the brake sensor 27 detects the fact that the brake pedal is depressed a predetermined amount when the vehicle 1 is stationary with the shift lever 28 positioned in the D position. The transmission ECU 12 terminates the neutral control operation and performs a return control operation to return the automatic transmission 5 from the neutral mode to the drive mode if the operation of the brake pedal made to depress the brake pedal the predetermined amount becomes undetectable by the brake sensor 27 while the neutral control operation is being performed. That is, the transmission ECU 12 includes neutral control means of the present invention.

Here, the term "the vehicle is stationary" as used in the present invention means that the vehicle is stopped with predetermined conditions satisfied. For example, it refers to the state of the vehicle at a time when the vehicle speed is 0 and the accelerator opening is 0. The term "neutral mode" as used above means the state where the driving force of the engine 2 in the D range is not transmitted to the front wheels via the torque converter 3 and the transmission mechanism 4. For example, it refers to the case where the C1 clutch 75 as a forward clutch is half-engaged. At this time, the B1 brake 72 is engaged to prevent the vehicle from rolling backward downhill. The term "drive mode" as used in this embodiment means the state where the driving force of the engine 2 in the D range is transmitted to the front wheels via the torque converter 3 and the transmission mechanism 4. For example, it refers to the state where the C1 clutch 75 is engaged. The term "half-engaged" as used in this embodiment refers to the state in which the C1 clutch 75 is held in slipping engagement. Therefore, the term "half-engaged" does not necessarily mean that the engaging pressure necessary to half-engage the C1 clutch 75 is a half of that necessary to fully engage the C1 clutch 75 but that the C1 clutch 75 is engaged under a pressure lower than that necessary to fully engage it so that the C1 clutch 75 can slip.

The transmission ECU 12 constituting the control device for the automatic transmission 5 acquires a signal representing the temperature of hydraulic oil from the oil temperature sensor 33 at the start of a neutral control operation, and measures the temperature of hydraulic oil based on the signal. That is, the transmission ECU 12 includes hydraulic oil temperature measuring means of the present invention.

The transmission ECU 12 acquires a signal representing the rotational speed NT of the turbine 44 of the torque converter 3 (see FIG. 2) from the turbine rotational speed sensor 30 and a signal representing the engine rotational speed NE from the engine rotational speed sensor 21 via the engine ECU 11, and calculates, from the speed ratio, the speed ratio between the engine speed 2 and the rotational speed of the turbine 44 of the torque converter 3 (which is hereinafter referred to simply as "actual speed ratio of the torque converter 3") NT/NE. That is, the transmission ECU 12 includes actual speed ratio calculating means of the present invention.

The transmission ECU 12 also acquires a signal representing the hydraulic oil temperature from the oil temperature sensor 33 of the hydraulic control circuit 9 and sets a target speed ratio as a target value for the speed ratio of the torque converter 3 suitable for the hydraulic oil temperature with reference to a target speed ratio map stored in the ROM of the transmission ECU 12 at the start of a neutral control operation. That is, the transmission ECU 12 includes target speed ratio setting means of the present invention.

Figure 5:
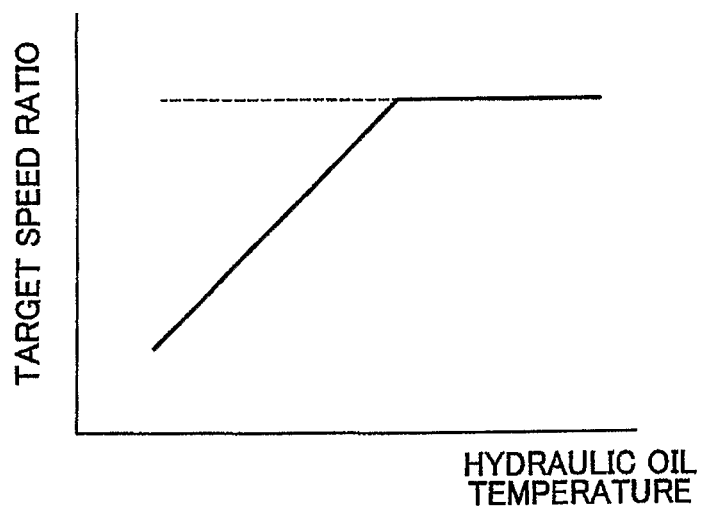
FIG. 5 is a schematic view illustrating a target speed ratio map defining the relation between the hydraulic oil temperature and the target speed ratio for the torque converter.

FIG. 5 is a schematic view illustrating a target speed ratio map defining the relation between the hydraulic oil temperature and the target speed ratio for the torque converter. In the target speed ratio map of this embodiment, when the hydraulic oil has a normal temperature higher than a predetermined threshold value, the hydraulic pressure response is nearly the same regardless of the oil temperature since the viscosity of the hydraulic oil is low and almost constant. Therefore, the target speed ratio for the torque converter 3 is set to be substantially constant. When the hydraulic oil temperature is in a low temperature range lower than the predetermined threshold value, the lower the hydraulic oil temperature becomes, the higher the viscosity of the hydraulic oil gets. Therefore, the target speed ratio is set to be lower as the hydraulic oil temperature is lower. The term "normal temperature of the hydraulic oil" as used in the present invention means an oil temperature in a temperature range in which the viscosity of the hydraulic oil can be regarded as generally constant. The normal temperature means a temperature of 80° C. or higher, for example.

The dotted line in FIG. 5 represents a neutral control operation to which the embodiment of the present invention is not applied (which is hereinafter referred to as "comparative example"). In the comparative example, the transmission ECU 12 is set such that the speed ratio of the torque converter 3 in the case where the hydraulic oil temperature is low is equal to that in the case where the hydraulic temperature is normal, and the increase in viscosity of the hydraulic oil is not taken into account at all.

Referring again to FIG. 1, the transmission ECU 12 controls the linear solenoid valve SL1, for example, with reference to an engaging pressure map (not shown) stored in the ROM thereof such that the engaging pressure on the C1 clutch 75 is adjusted based on the difference between the actual speed ratio of the torque converter 3 and the set target speed ratio.

The transmission ECU 12 starts feedback control a predetermined period of time after the start of a neutral control operation. In the feedback control, the transmission ECU 12 calculates the actual speed ratio of the torque converter 3 based on the signals inputted from the engine rotational speed sensor 21 and the turbine rotational speed sensor 30, and adjusts the engaging pressure on the C1 clutch 75 to bring the actual speed ratio equal to the target speed ratio when the actual speed ratio is significantly different from the target speed ratio.

More specifically, the transmission ECU 12 performs feedback control based on the difference between the actual speed ratio of the torque converter 3 and the target speed ratio therefor and the engaging pressure on the C1 clutch 75 to keep the actual speed ratio of the torque converter 3 equal to the target speed ratio at all times during a neutral control operation. The transmission ECU 12 terminates the feedback control when it starts a return control operation.

Since the feedback control is performed based on the actual speed ratio of the torque converter 3 and the engaging pressure on the C1 clutch 75, the transmission ECU 12 adjusts the engaging pressure on the C1 clutch 75 taking into account the effects of uncertainties caused by a drag in the automatic transmission 5 and so on as well as the viscosity of the hydraulic oil in the C1 clutch 75.

Figure 6:
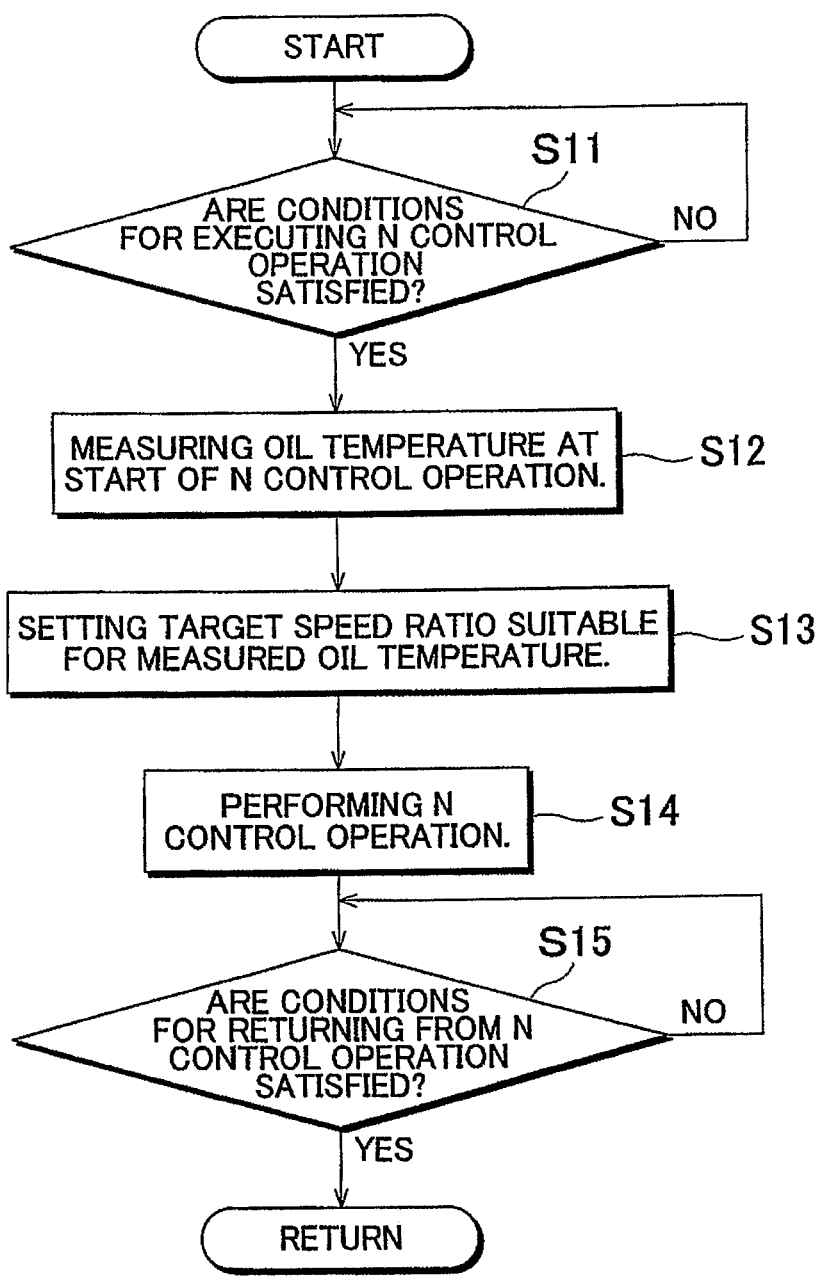
FIG. 6 is a flowchart for explaining the function of the control device for an automatic transmission according to the embodiment of the present invention.

FIG. 6 is a flowchart for explaining the function of the control device for an automatic transmission according to the embodiment of the present invention. The following operation is performed at predetermined time intervals by the CPU constituting the transmission ECU 12 and realizes a program processable by the CPU.

First, the transmission ECU 12 determines whether or not the conditions for executing a neutral control operation are satisfied (step S11). More specifically, the transmission ECU 12 determines whether or not the signal inputted from the brake sensor 27 is a signal representing "brake ON."

If it is determined that the inputted signal is a signal representing "brake ON," the transmission ECU 12 determines whether or not a signal representing the fact that the shift lever 28 is positioned in the D range has been inputted from the operating position sensor 29, whether or not a signal representing the fact that the vehicle speed is 0 has been inputted from the vehicle speed sensor 25, and whether or not signal representing the fact that the accelerator opening is 0 has been inputted from the accelerator opening sensor 32. If it is determined that these signals have been all inputted, the transmission ECU 12 determines that the conditions for executing a neutral control operation are satisfied.

If the signal inputted from the brake sensor 27 is a signal representing "brake OFF," a signal representing the D range has not been inputted, a signal representing the fact that the vehicle speed is 0 has not been inputted or a signal representing the fact that the accelerator opening is 0 has not been inputted (No in step S11), the transmission ECU 12 determines that the conditions for executing a neutral control operation are not satisfied and repeats this step.

If it is determined that the conditions for executing a neutral control operation are satisfied (Yes in step S11), the transmission ECU 12 measures the hydraulic oil temperature (step S12). More specifically, the transmission ECU 12 acquires a signal representing the hydraulic oil temperature from the oil temperature sensor 33, and measures the hydraulic oil temperature based on the acquired signal.

Then, the transmission ECU 12 sets a target speed ratio for the torque converter 3 suitable for the measured hydraulic oil temperature (step S13).

More specifically, the transmission ECU 12 sets a target speed ratio for the torque converter 3 suitable for the measured hydraulic oil temperature based on the target speed ratio map showing the correspondence between the hydraulic oil temperature and the target speed ratio and stored in the ROM thereof.

Then, the transmission ECU 12 performs a neutral control operation (step S14).

More specifically, the transmission ECU 12 starts a neutral control operation by disengaging the C1 clutch 75 into a half-engaged state and engaging the B1 brake 72 via the hydraulic control circuit 9.

The transmission ECU 12 also calculates the actual speed ratio of the torque converter 3 based on the engine rotational speed NE and the turbine rotational speed NT inputted from the engine rotational speed sensor 21 and the turbine rotational speed sensor 30, respectively, during a neutral control operation. If the actual speed ratio is significantly different from the target speed ratio as a result of the calculation, the transmission ECU 12 performs feedback control to adjust the engaging pressure on the C1 clutch 75 via the hydraulic control circuit 9 in order to bring the actual speed ratio of the torque converter 3 equal to the target speed ratio.

Next, the transmission ECU 12 determines whether or not a neutral returning condition, which is the condition for returning from the neutral control operation, is satisfied (step S15).

More specifically, the transmission ECU 12 determines whether or not the signal inputted from the brake sensor 27 represents "OFF" (step S15). Here, if the transmission ECU 12 determines that a signal inputted from the brake sensor 27 represents "ON" (No in step S15), the transmission ECU 12 repeats this step.

If the transmission ECU 12 determines that a signal inputted from the brake sensor 27 represents "OFF" (Yes in step S15), the transmission ECU 12 terminates the routine. More specifically, the transmission ECU 12 brings the C1 clutch 75 from a half-engaged state to a fully engaged state gradually and releases the B1 brake 72 via the hydraulic control circuit 9. Then, the transmission ECU 12 performs a return control operation to establish the first gear ratio in the transmission 4, and returns to step S11.

Figure 7:
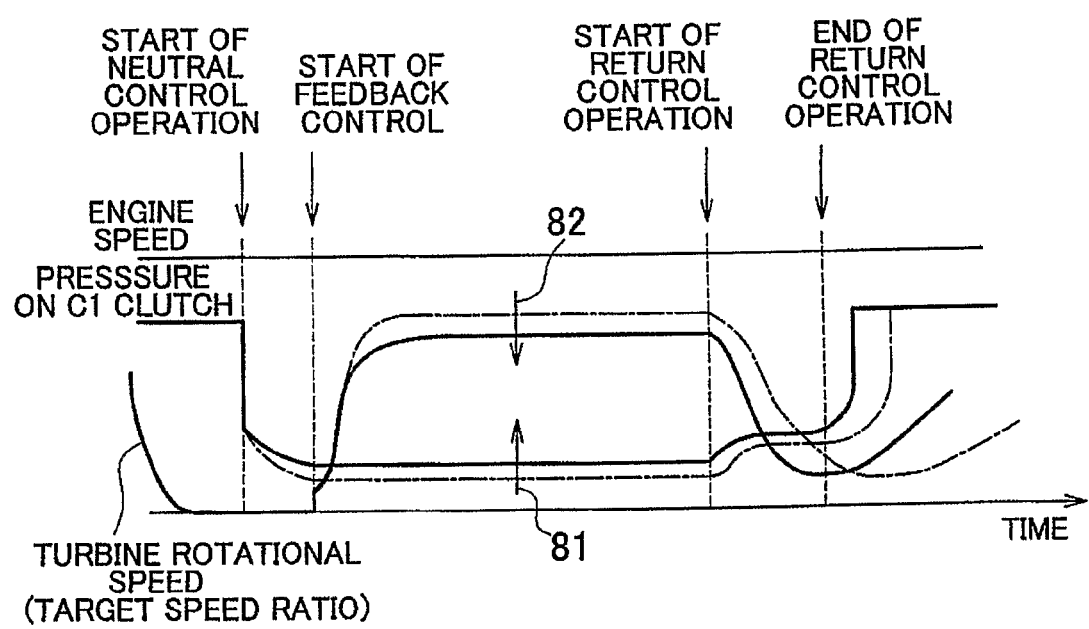
FIG. 7 is a timing chart showing the changes with time in the turbine rotational speed and the engaging pressure on the C1 clutch in the case where the oil temperature is low during a neutral control operation according to the embodiment of the present invention.

FIG. 7 is a timing chart showing the changes with time in the turbine rotational speed and the engaging pressure on the C1 clutch in the case where the oil temperature is low during a neutral control operation according to the embodiment of the present invention.

In this timing chart, the solid lines show the changes with time in the turbine rotational speed NT and the engaging pressure on the C1 clutch 75 in the case where the oil temperature is low during a neutral control operation according to this embodiment of the present invention, and the dot-and-dash lines show the changes with time in the turbine rotational speed NT and the engaging pressure on the C1 clutch 75 in the case where the oil temperature is low during a neutral control operation of the comparative example, to which the embodiment of the present invention is not applied.

In FIG. 7, the engine rotational speed NE is also shown by a solid line. In the timing chart, the engine rotational speed NE is regarded as being generally constant. Thus, the changes with time in the turbine rotational speeds NT represented by solid and dot-and-dash lines and the changes with time in the speed ratio of the torque converter 3 exhibit generally the same trends.

If the hydraulic oil temperature is low when the conditions for executing a neutral control operation are satisfied, the transmission ECU 12 of this embodiment sets a target speed ratio such that the speed ratio of the torque converter 3 will be lower than that in the case where the hydraulic oil temperature is low in the comparative example as indicated by an arrow 82. Thus, the transmission ECU 12 increases the engaging pressure on the C1 clutch 75 higher than that in the case where the hydraulic oil temperature is low in the comparative example as indicated by an arrow 81 so that the speed ratio of the torque converter 3 can be equal to the set target speed ratio.

When the engaging pressure on the C1 clutch 75 is increased, the rotational speed of the input shaft of the transmission mechanism 4 decreases toward that of the output shaft of the transmission mechanism 4 of 0. As a result, the rotational speed NT of the turbine 44 connected to the input shaft of the transmission mechanism 4 decreases as compared to that in the case where the hydraulic oil temperature is low in the comparative example as indicated by the arrow 82.

Since the transmission ECU 12 performs feedback control between the time indicated as "start of feedback control" and the time indicated as "start of return control operation" in FIG. 7 to adjust the engaging pressure on the C1 clutch 75 based on the actual speed ratio of the torque converter 3, the actual speed ratio of the torque converter 3 can be prevented from deviating significantly from the target speed ratio during a neutral control operation.

On the other hand, in the neutral control operation of the comparative example, the engaging pressure on the C1 clutch 75 has not increased sufficiently at the time of end of the return control operation in the neutral control operation of this embodiment as shown by a dot-and-dash line in FIG. 7 and the return control operation is still continued at this point of time.

When the hydraulic oil temperature is normal, the transmission ECU 12 performs a neutral control operation to minimize the generation of creep force. Thus, the transmission ECU 12 sets the target speed ratio of the torque converter 3 to a relatively high value, which is equal to that in the comparative example indicated by a dot-and-dash line, and adjusts the engaging pressure on the C1 clutch 75 to bring the actual speed ratio of the torque converter 3 equal to the set target speed ratio when feedback control is started during the neutral control operation. In this case, the engaging pressure on the C1 clutch 75 reaches a low value equal to that in the comparative example indicated by a dot-and-dash line. When the hydraulic oil temperature is normal, since the viscosity of the hydraulic oil is low and the hydraulic pressure response is quick, the return control operation is ended at the time indicated as "end of return control operation" in FIG. 7 unlike in the comparative example shown by dot-and-dash lines.

FIGS. 8A, 8B and 8C are timing charts showing the changes in the turbine rotational speed, the engaging pressure on the C1 clutch and output torque during a neutral control operation according to the embodiment of the present invention.

In FIG. 8, the solid lines represent the changes in the turbine rotational speed NT, the engaging pressure on the C1 clutch 75 and the output torque in the case where the oil temperature is low during a neutral control operation according to this embodiment of the present invention, and the dotted lines represent the changes in them in the case where the oil temperature is normal during a neutral control operation. The dot-and-dash lines represent the changes in the turbine rotational speed NT, the engaging pressure on the C1 clutch 75 and output torque in the case where the oil temperature is low during a neutral control operation of the comparative example.

FIG. 8A shows the changes with time in the turbine rotational speed NT. The engine rotational speed NE is also shown by a solid line. In this embodiment, the turbine rotational speed NT of the torque converter 3 in the case where the hydraulic oil temperature is low is lower than that in the case where the hydraulic oil temperature is normal during the neutral control operation before a time t1 when a return control operation is started as shown by the solid line in FIG. 8A. On the contrary, the turbine rotational speed NT of the torque converter 3 during a neutral control operation in the comparative example represented by the dot-and-dash line is almost the same as the turbine rotational speed NT in the case where the hydraulic oil temperature is normal shown by the dotted line.

The transmission ECU 12 starts a return control operation to return the automatic transmission 5 from the neutral mode to the drive mode at the time t1. Then, the turbine rotational speed NT decreases as the C1 clutch 75 is engaged. Here, when the hydraulic oil temperature is low, since the turbine rotational speed NT has been previously decreased, the return control operation is ended at almost the same time at a time t2 at which the return control is ended when the hydraulic oil temperature is normal.

In the return control operation of the comparative example in the case where the oil temperature is low, the return control operation has not been ended yet and the turbine rotational speed NT is higher as compared to the return control operation of this embodiment at the time t2 as shown by the dot-and-dash line. In the comparative example, the return control operation is ended at a time t3.

FIG. 8B shows the changes with time in the engaging pressure on the C1 clutch 75. In this embodiment, the engaging pressure on the C1 clutch 75 in the case where the oil temperature is low indicated by the solid line is controlled by the transmission ECU 12 to be higher than that in the case where the oil temperature is normal indicated by the dotted line before the time t1 when the return control operation is started as shown in FIG. 8B.

On the other hand, in the neutral control operation of the comparative example, the transmission ECU 12 sets the target speed ratio of the torque converter 3 to a fixed value regardless of the hydraulic oil temperature. Thus, even when the hydraulic oil temperature is low, the target speed ratio of the torque converter 3 is set to a value equal to the target speed ratio in the case where the hydraulic oil temperature is normal. In this case, the transmission ECU 12 controls the engaging pressure on the C1 clutch 75 to be lower than that in the case where the oil temperature is normal to prevent a decrease in the turbine rotational speed NT caused by the drag of the C1 clutch 75 due to the high viscosity of the hydraulic oil. Therefore, as shown by the dot-and-dash line, the engaging pressure on the C1 clutch 75 in the case where the oil temperature is low during the neutral control operation of the comparative example is lower than those during the neutral control operation of this embodiment in both the cases where the oil temperature is low and the oil temperature is normal.

In the return control operation of this embodiment, which is performed after the time t1 in FIG. 8B, when the transmission ECU 12 starts a return control operation at the time t1, the engaging pressure on the C1 clutch 75 increases quickly in both the cases where the oil temperature is low and the oil temperature is normal as shown by the solid and dotted lines, and the C1 clutch 75 is engaged smoothly.

In the return control operation of the comparative example in the case where the oil temperature is low, since the response of the hydraulic oil is slow because of the high viscosity of the hydraulic oil, the engaging pressure on the C1 clutch 75 does not increase quickly even when the transmission ECU 12 starts a return control operation at the time t1 as shown by the dot-and-dash line. The engaging pressure increases gently from the time t1 when the return control operation is started and reaches a desired value at a time t3 which is later than the time t2 when the return control operation is ended in this embodiment.

FIG. 8C shows the changes with time in the output torque of the automatic transmission 5.

As shown by the dot-and-dash line, the output torque does not increase for some time after the start of the return control operation at the time t1 in the return control operation of the comparative example in the case where the oil temperature is low, which indicates poor starting performance (hesitation) of the vehicle. Also, in the comparative example in the case where the oil temperature is low, the output torque suddenly increases immediately before the time t3 when the return control operation is ended, which indicates that the C1 clutch 75 is suddenly engaged and a shock occurs to the vehicle.

In the return control operation of this embodiment, the rise in output torque in the case where the oil temperature is low indicated by the solid line follows almost the same curve as the rise in output torque in the case where the oil temperature is normal indicated by the dotted line. This indicates that even when the hydraulic oil temperature is low and the hydraulic oil has a high viscosity, the hydraulic pressure response is improved as compared to the comparative example and almost the same output torque rise characteristic as that achieved in the case where the hydraulic oil temperature is normal can be achieved.

As described above, if the hydraulic oil temperature is low when the automatic transmission 5 is shifted to the neutral mode, the control device for an automatic transmission according to this embodiment of the present invention sets the target speed ratio for the torque converter 3 to a value which is lower than that in the case where hydraulic oil temperature is normal and previously maintains the engaging pressure on the C1 clutch 75 at a value higher than usual in order to improve the hydraulic pressure response. Thus, when the automatic transmission 5 is returned from the neutral mode to the drive mode, even if the temperature of the hydraulic oil is low and the viscosity of the hydraulic oil is high, a delay in the rise of the engaging pressure on the C1 clutch 75 can be prevented and the C1 clutch 75 can be engaged smoothly. It is, therefore, possible to prevent a shock from being applied to the vehicle 1 at the start of the vehicle 1 and deterioration of the starting performance of the vehicle 1 (hesitation) and thus to improve the driveability.

Also, the control device for an automatic transmission according to this embodiment of the present invention can set the target speed ratio for the torque converter 3 to a lower value and set the engaging pressure on the C1 clutch 75 during a neutral control operation to a higher value as the hydraulic oil temperature is lower. Therefore, even if the viscosity of the hydraulic oil is further increased, a delay in the rise of the engaging pressure on the C1 clutch 75 can be prevented and the C1 clutch 75 can be engaged smoothly. It is, therefore, possible to prevent a shock from being applied to the vehicle 1 at the start of the vehicle 1 and deterioration of the starting performance of the vehicle 1 and thus to improve the driveability.

In addition, the control device for an automatic transmission according to this embodiment of the present invention can perform feedback control to adjust the engaging pressure on the C1 clutch 75 properly in order to bring the actual speed ratio of the torque converter 3 closer to the target speed ratio based on the difference between the actual speed ratio of the torque converter 3 and the target speed ratio therefor when the automatic transmission 5 is in the neutral mode. Therefore, the actual speed ratio of the torque converter 3 and the engaging pressure on the C1 clutch 75 can be always maintained at optimum values. As a result, since the engaging pressure on the C1 clutch 75 has reached an optimum value when returning the automatic transmission 5 from the neutral mode to the drive mode is started, the C1 clutch 75 can be engaged smoothly during the returning process and the driveability during the return control operation can be further improved.

Further, since the control device for an automatic transmission according to this embodiment of the present invention can perform feedback control based on the speed ratio of the torque converter 3 and the engaging pressure on the C1 clutch 75, the engaging pressure on the C1 clutch 75 can be adjusted taking into account the effects of uncertainties caused by a drag in the automatic transmission 5 and so on as well as the viscosity of the hydraulic oil in the C1 clutch 75. Thus, the actual speed ratio of the torque converter 3 and the engaging pressure on the C1 clutch 75 can be always maintained at optimum values. As a result, since the engaging pressure on the C1 clutch 75 has reached an optimum value when returning the automatic transmission 5 from the neutral mode to the drive mode is started, the C1 clutch 75 can be engaged smoothly during the returning process and the driveability at the start of the vehicle can be further improved.

While the case where the relation between the hydraulic oil temperature and the target speed ratio in the target speed ratio map is expressed as a linear function in a low temperature range as shown in FIG. 5 is described in this embodiment, the present invention is not limited thereto as long as the target speed ratio is lower as the hydraulic oil temperature is lower in the low temperature range.

The transmission ECU 12 may have a target speed ratio map in which the hydraulic oil temperature is divided into a plurality of, three, for example, sections in a low temperature range and each section is associated with a target speed ratio. In this case, the transmission ECU 12 determines to which section the measured hydraulic oil temperature belongs, acquires a value corresponding to the section from the target speed ratio map, and sets it as the target speed ratio. Further, the transmission ECU 12 may have a plurality of target speed ratio maps associated with different engine rotational speeds NE. In this case, the transmission ECU selects a target speed ratio map based on the engine rotational speed acquired from the engine rotational speed sensor 21.

While the case where the transmission mechanism 4 has six gear ratios at the maximum is described in this, embodiment, the present invention is not limited thereto. The transmission mechanism 4 may be configured to have five or less gear ratios or seven or more gear ratios.

While the case where the control device for an automatic transmission according to the present invention is mounted in an FF vehicle is described in this embodiment, the present invention is not limited thereto. The control device for an automatic transmission according to the present invention is applicable to an FR vehicle or other types of vehicle.

As has been previously described, the control device for an automatic transmission according to the present invention can prevent a delay in the rise of the engaging pressure on the engagement element and ensure smooth engagement of the engagement element when the automatic transmission is returned from the neutral mode to the drive mode even if the temperature of hydraulic oil is low and the viscosity of the hydraulic oil is high. Therefore, the control device for an automatic transmission according to the present invention has the beneficial effects of preventing a shock from being applied to the vehicle at the start of the vehicle and deterioration of the starting performance of the vehicle and improving the driveability, and is useful for a control device for an automatic transmission which performs a neutral control operation.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the invention.

The invention claimed is:

1. A method for controlling an automatic transmission including a transmission mechanism having an engagement element which is engaged at startup, and a torque converter configured to transmit power from a power source to the transmission mechanism, comprising:
performing a neutral control operation which decreases an engaging pressure on the engagement element when a vehicle is stationary in a forward range;
measuring temperature of hydraulic oil which operates the engagement element at the start of the neutral control operation;
acquiring the rotational speed of the power source and the rotational speed of a turbine of the torque converter;

calculating a speed ratio of the torque converter represented by the ratio between the rotational speed of the power source and the rotational speed of the turbine of the torque converter as an actual speed ratio;

setting a target speed ratio as a target value for the speed ratio of the torque converter such that the actual speed ratio becomes lower than the speed ratio in the case where the hydraulic oil temperature is normal when the temperature of hydraulic oil measured by a hydraulic oil temperature measuring portion is in a low temperature range that is lower than a predetermined threshold value and a decrease of a hydraulic pressure response is caused by an increase of a viscosity of the hydraulic oil, wherein the target speed ratio is set lower as the temperature of the hydraulic oil becomes lower when the temperature of the hydraulic oil is lower than the predetermined threshold value;

adjusting the engaging pressure on the engagement element which brings the actual speed ratio equal to the target speed ratio, wherein when the temperature of the hydraulic oil is in the low temperature range, the engaging pressure becomes higher than the engaging pressure when the temperature of the hydraulic oil is normal; and performing a return control operation which engages the engagement element at the start of the vehicle.

2. The control method according to claim 1, further comprising:

performing feedback control during a neutral control operation which adjusts the engaging pressure on the engagement element based on the difference between the actual speed ratio and the target speed ratio, bringing the actual speed ratio equal to the target speed ratio.

3. A control device for an automatic transmission including a transmission mechanism having an engagement element which is engaged at startup, and a torque converter configured to transmit power from a power source to the transmission mechanism, comprising:

a neutral control portion that performs a neutral control operation configured to decrease an engaging pressure on the engagement element when a vehicle is stationary in a forward range and performs a return control operation configured to engage the engagement element at the start of the vehicle;

a hydraulic oil temperature measuring portion that measures temperature of hydraulic oil for operating the engagement element at the start of the neutral control operation;

an actual speed ratio calculating portion that acquires the rotational speed of the power source and the rotational speed of a turbine of the torque converter and calculates a speed ratio of the torque converter represented by the ratio between the rotational speed of the power source and the rotational speed of the turbine of the torque converter as an actual speed ratio; and a target speed ratio setting portion that sets a target value for the speed ratio of the torque converter as a target speed ratio, wherein, when the temperature of hydraulic oil measured by the hydraulic oil temperature measuring portion is in a low temperature range that is lower than a predetermined threshold value and a decrease of a hydraulic pressure response is caused by an increase of a viscosity of the hydraulic oil, the target speed ratio setting portion sets the target speed ratio such that the actual speed ratio becomes lower than the speed ratio in the case where the hydraulic oil temperature is normal, and wherein the neutral control portion adjusts the engaging pressure on the engagement element to bring the actual speed ratio equal to the target speed ratio during the neutral control operation, wherein the target speed ratio setting portion sets the target speed ratio lower as the temperature of the hydraulic oil becomes lower when the temperature of the hydraulic oil is lower than the predetermined threshold value, wherein when the temperature of hydraulic oil is in the low temperature range, the engaging pressure becomes higher than the engaging pressure when the temperature of the hydraulic oil is normal.

4. The control device according to claim 3, wherein the neutral control portion maintains the engaging pressure on the engagement element higher than that in the case where the hydraulic oil temperature is normal causing the actual speed ratio to become equal to the target speed ratio during the neutral control operation.

5. The control device according to claim 3, wherein the normal temperature of the hydraulic oil is a temperature in a temperature range in which the viscosity of the hydraulic oil is constant, and the threshold value is the boundary temperature between low and normal temperature ranges for the hydraulic oil.

6. The control device according to claim 3, wherein the threshold value is 80° C.

7. The control device according to claim 3, wherein the neutral control operation is performed while a forward gear ratio is established in the automatic transmission and a brake pedal is being depressed a predetermined amount or more.

8. The control device according to claim 3, wherein the control device adjusts the engaging pressure on the engagement element by controlling the pressure of the hydraulic oil which operates the engagement element.

9. The control device according to claim 3, wherein the neutral control portion performs feedback control during a neutral control operation which adjusts the engaging pressure on the engagement element based on the difference between the actual speed ratio and the target speed ratio which brings the actual speed ratio equal to the target speed ratio.

* * * * *